United States Patent
Soscia et al.

(10) Patent No.: US 7,325,042 B1
(45) Date of Patent: Jan. 29, 2008

(54) SYSTEMS AND METHODS TO MANAGE INFORMATION PULLS

(75) Inventors: Matthew Soscia, Mountain View, CA (US); Mike Cleron, Menlo Park, CA (US); Sanjay Sahgal, Fremont, CA (US)

(73) Assignee: Microsoft Corporation, Redmond, WA (US)

( * ) Notice: Subject to any disclaimer, the term of this patent is extended or adjusted under 35 U.S.C. 154(b) by 593 days.

(21) Appl. No.: 10/179,829

(22) Filed: Jun. 24, 2002

(51) Int. Cl.
*G06F 15/16* (2006.01)
(52) U.S. Cl. ...................... 709/219; 709/217
(58) Field of Classification Search ............... 709/217, 709/219; 725/86
See application file for complete search history.

(56) References Cited

U.S. PATENT DOCUMENTS

| | | | |
|---|---|---|---|
| 6,292,825 B1 * | 9/2001 | Chang et al. ............... | 709/206 |
| 6,510,556 B1 * | 1/2003 | Kusaba et al. ............... | 725/93 |
| 2002/0049717 A1 * | 4/2002 | Routtenberg et al. .......... | 707/1 |
| 2002/0078363 A1 * | 6/2002 | Hill et al. ................... | 713/189 |
| 2002/0078449 A1 * | 6/2002 | Gordon et al. ............... | 725/41 |
| 2002/0161685 A1 * | 10/2002 | Dwinnell ..................... | 705/36 |
| 2004/0054670 A1 * | 3/2004 | Noff et al. ..................... | 707/3 |

* cited by examiner

*Primary Examiner*—Jason Cardone
*Assistant Examiner*—Chirag R Patel

(57) ABSTRACT

The described implementations provide arrangements and procedures to manage information pulls. To request data from another program or computer is termed a "pull". Specifically, a registration scheduling data pulls from a data feed is received from a first object. In one implementation, the data feed is specified with a Universal Resource Identifiers (URIs). A URI is a generic term for all types of names and addresses that refer to source content. The registration further indicates a second object to receive and cache the data downloads on behalf of the first object. Responsive to receiving the registration, data downloads from the data feed are provided to the second object. In one implementation, the second object customizes the data downloads to specific data format(s) and/or structures for subsequent access by the first object.

68 Claims, 4 Drawing Sheets

SYSTEMS AND METHODS TO MANAGE INFORMATION PULLS

TECHNICAL FIELD

This invention relates to managing information pulls.

BACKGROUND

Users of networked applications typically specify, via the application, the data that they are interested in as well as from where the specified data will be downloaded. Application developers, system administrators, etc., can control types, source, quality, etc. information that the user can access via the application. However, to accomplish such control, additional monitoring applications and/or device configuration information typically needs to be installed onto the device that hosts the application. Installing such additional monitoring applications and/or configuration information onto the device is substantially problematic in low resource environments (meaning that a client such as a mobile handheld device has limited memory and/or processing resources), wherein the amount of memory reserved for program data is limited.

Making this situation more difficult, is that computing devices typically have more than one application installed such as Web browsers, e-mail clients, etc., that can access networked content providers. Each application would need to have corresponding monitoring applications and/or configuration information to provide high level control over information that is accessed via the application. This increases application program size and processing requirements, both of which are contrary to substantially optimal program data requirements of a low resource (i.e., memory and/or processing resources) client.

The following described arrangements and methodologies address these and other limitations of conventional systems and techniques for managing application access to source content.

SUMMARY

The described implementations provide arrangements and procedures to manage information pulls. To request data from another program or computer is termed a "pull" (e.g., an application may request a forecast from a weather service, headlines from a news service, and so on). Specifically, a registration scheduling data pulls from a data feed is received from a first application. In one implementation, the data feed is specified with a Universal Resource Identifiers (URIs). A URI is a generic term for all types of names and addresses that refer to source content. The registration further indicates a second object to receive and cache the data downloads on behalf of the first application. Responsive to receiving the registration, data downloads from the data feed are provided to the second object. In one implementation, the second object customizes the data downloads to specific data format(s) and/or structures for subsequent access by the first application.

BRIEF DESCRIPTION OF THE DRAWINGS

The same numbers are used throughout the drawings to reference like features and components.

DETAILED DESCRIPTION

Overview

Figure 1:
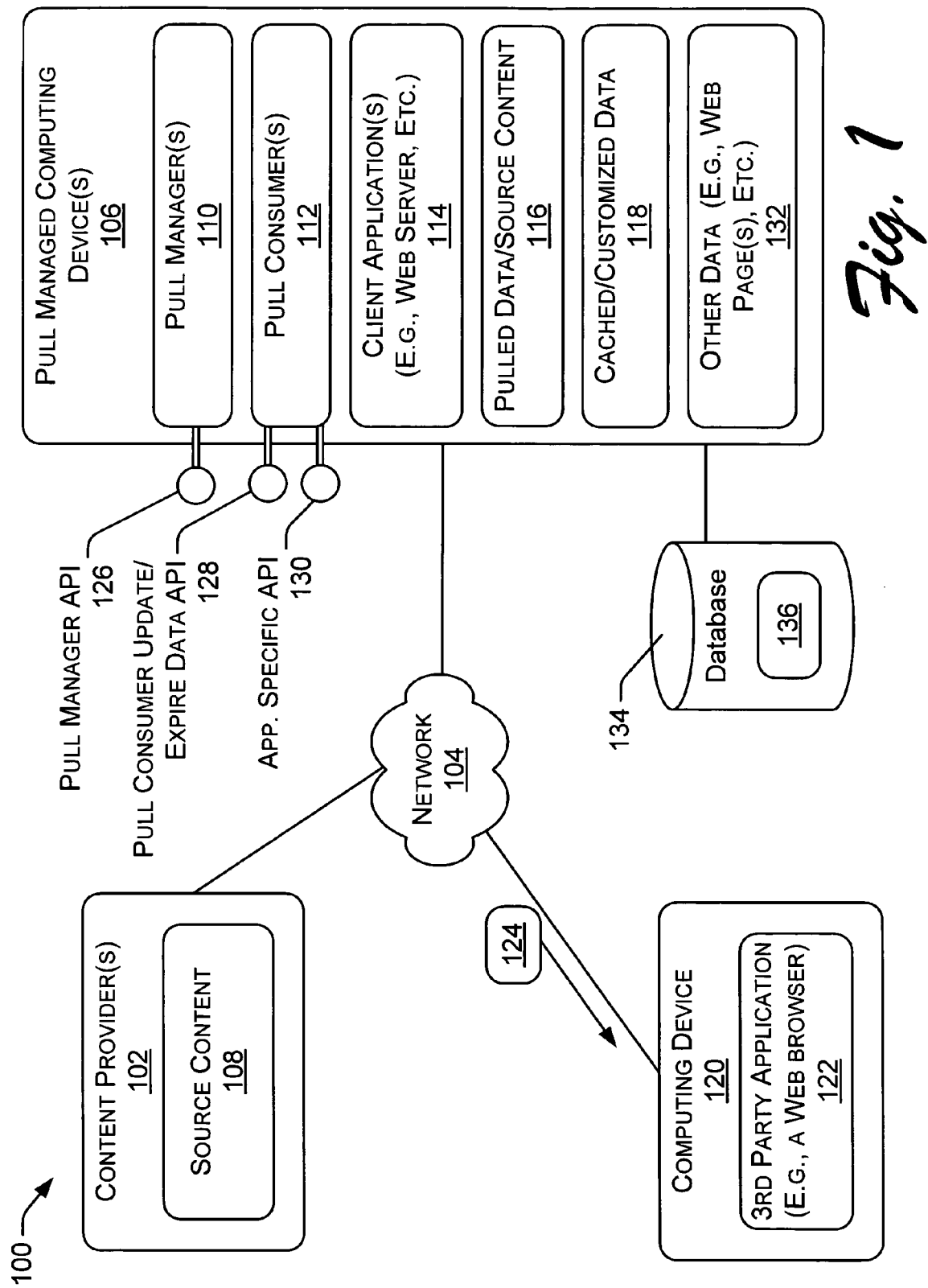
FIG. 1 shows an exemplary system to efficiently pull and distribute local and/or remote source content to client applications.

The following described systems and arrangements provide for highly flexible and customizable data pull architectures. Specifically, client application(s) that consume source content from content providers are not dedicated to actual data pulling, caching, parsing and/or transformation activities with respect to consumed source content. Rather, client application(s) are "client(s)" that receive benefits of respective partner operations that pull (i.e., pull manager(s)), cache, and customize pulled data (i.e., pull consumer(s)) into specific data formats, data structures, and so on, on behalf of the client application(s).

Additionally, developers that generate client application(s) based on the following described systems and arrangements can particularly specify data feeds to source content that is to be accessed by their respective applications. Such data feeds can be specified in a number of different ways such as during application design, at run-time (e.g., by evaluation of configuration files that can be modified or updated via standard word processing programs or by presentation of a dialog box management console application to an administrator or user), and so on. This provides application developers with substantial control over the source, quality, and reliability of information that is available to users of the client application.

Moreover, a pull manager substantially optimizes or synchronizes its pulling operations across multiple client applications by identifying and consolidating multiple requested data pulls that are each respectively based on same data pulling criteria. For instance, multiple client application requested data pulls to a same data feed that are scheduled for a same time are consolidated by the pull manager into a single data pull operation. The pull manager updates any number of corresponding client application registered pull consumers with the information from the consolidated/single data pull. Furthermore, a single pull consumer itself can be shared across multiple client applications. Thus, application developers can design suites of applications that have access to the same data that has a similar point-in-time data freshness.

Each of these aspects substantially reduce client application code footprints, data storage requirements, and development expenses, while substantially increasing client application configurability and scalability across multiple hardware platforms (e.g., thin clients, mobile devices such as handhelds or laptop devices, multiprocessor and microprocessor-based systems, and so on).

The following subject matter is described with specificity to meet statutory requirements. However, the description itself is not intended to limit the scope of this patent. For example, XML is often specified as an exemplary data format. However, this exemplary data format is not limited to XML. For instance, wherever XML is specified, any other data format could be utilized as well such as ASCII text, SGML, and so on.

An Exemplary System

FIG. 1 shows an exemplary system 100 to efficiently manage information pulls. The system 100 includes content provider(s) 102 coupled over network 104 (e.g., wireless, terrestrial, satellite, the Internet, an Intranet, etc.) to pull managed computing device(s) 106. Each content provider includes one or more network servers (not shown) such as a Web server, an electronic programming guide (EPG) server, a video-on-demand (VOD) server, an audio server, and/or other servers, that respectively deploy source content 108. Source content includes any type of data that can be represented electronically, for example, text, HTML, XML, JavaScript, MPEG, application metadata, data files, and so on.

Pull managed computing device 106 includes pull manager(s) 110, pull consumer(s) 112, and client application(s) 114 (e.g., Web site walled garden applications, mobile device applications, data search applications, and so on). (A walled garden is a web site (typically HTML) that contains no links to external Web sites). Pull manager(s) 110 pull source content 108 from content provider(s) 102 and store it locally as pulled data 116. Pull consumer(s) 112 cache pulled data 116 and may optionally customize the cached data to generate cached/customized data 118. Cached/customized data represents pulled data that has been cached and possibly modified (e.g., parsed, transformed, and/or otherwise organized into predetermined data format(s), data structures(s), and so on) by the pull consumer. Client application(s) periodically retrieve at least portions of the cached/customized data. Thus, client application(s) receive the respective data pulling and data customization benefits performed by pull manager(s) and pull consumer(s).

A client application 114 utilizes pull manager Application Program Interface (API) 126 to: (a) generate or otherwise access a pull manager 110 (i.e., a single instance of the pull manager can be shared across multiple independent client applications executing in a same process space); and (b) indicate which data feed(s) are of interest to the registering client application. In one implementation, client application(s) specify one or more data feeds to source content 108 with corresponding Universal Resource Identifiers (URIs). A URI is a generic term for all types of names and addresses that refer to source content. A Universal Resource Locator (URL) is one kind of URI.

A client application 114 further utilizes pull manager API 126 to: (a) identify operational parameters of data pulls (e.g., refresh rates, time-outs, etc.) to be made by the generated/accessed pull manager with respect to the indicated data feeds; (b) register a particular pull consumer 112 with the pull manager; and (c) unregister a previously registered pull consumer. An exemplary pull manager API 126 is described in greater detail below in the section titled "Exemplary Pull Managed Device APIs".

Responsive to client application 114 registration of pull consumer 112, data feeds of interest, refresh rates, and so on, with pull manager 110, the pull manager actively gathers source content 108 from the data feeds of interest according to the indicated refresh rates. (Exemplary pull consumer registration entries are described in greater detail below in reference to TABLES 1 and 2). The pull manager 110 continues to pull and hand off, or otherwise communicate, corresponding source content to the registered pull consumer until either the data feed becomes unavailable, or until the client application unregisters the pull consumer at the pull manager via an "unregister" call to the pull manager API 126. When a data feed becomes unavailable, the pull manager will continue to attempt pulling, and will resume handing-off data as soon as it notices that the feed has become available again.

There are many different reasons why a data feed may become unavailable. For instance, a content provider may no longer support the data feed, a corresponding network server may malfunction, and so on. The pull manager informs a client application (e.g., see the ExpireData( ) method of TABLE 3) if a specified data feed is determined, by the pull manager, to no longer respond in a timely manner to requests for data.

In one implementation, the client application unregisters corresponding pull consumers during shutdown operations of the client application. In light of the above, only data feeds that are actually being used by client applications at the current time are pulled from content providers 102.

Pull manager 110 utilizes an "UpdateData" method exposed by pull consumer APIs 128 to hand off pulled source content 116 to a registered pull consumer 112. Pull manager 110 utilizes an "ExpireData" method exposed by pull consumer APIs 128 to indicate that the last pulled source content has expired based on freshness criteria provided by the client application 114 during registration of the pull consumer. In one consumer registration, this expiration will occur when the data feed has been unavailable for too long a time. An exemplary pull consumer API is described in greater detail below in the section titled "Exemplary Pull Managed Device APIs".

Pull consumer(s) 112 allow cached/customized data 118 to be accessed by client application(s) 110 in customizable data format(s) via exposed pull consumer APIs 130. APIs 130 are specific to each respective pull consumer 112.

For instance, in one implementation, a first pull consumer 112 exposes a first API 130 that is different than a second API 130 that is exposed by a second pull consumer 112. APIs 130 can be substantially optimized to the particular type of information that is received by the pull consumer from the pull manager. For instance, if data received by the pull consumer is stock quote information, an API 130 of this example may be GetQuote(string whichStock).

Accordingly, each pull consumer 112 is an intermediary between pull manager(s) 110 and a client application 114. Each pull consumer is an instance of a content or data feed to the client application. A pull consumer can be written and configured to contain more than one data feed and further configured to serve cached/customized data to multiple respective client applications.

Designers of pull consumers 112 specify the particular APIs 130 that a pull consumer will expose for client application 114 access. Pull consumer APIs 130 can be extended and/or otherwise customized to provide client application 114 specific data formats and/or structures. For instance, exposed pull consumer application specific APIs can provide full access to cached/customized data 118, specialized queries into cached/customized data, data freshness queries, and so on. A weather consumer 112 may provide APIs 130 for a client application 114 to retrieve current conditions and forecasts for a specified geographical region, city, and so on. In another example, a stock consumer 112 may provide APIs 130 for a client application 114 to retrieve stock symbol price and delta.

Additionally, pull consumer designers specify particular data customizations (e.g., parsing and/or transforming portions of pulled data 116 into specific data formats, structures, and so on), if any, that are performed on the pulled data by pull consumer(s) to generate customized data 118. These specific data formats and/or structures can be specified in advance to substantially optimize operations of client application(s) that receive the customized data. In other words, any number of different pull consumers can be architected to meet specific data needs of different client applications. The different types of pull consumers that can be designed are as unlimited as are the types of client applications (e.g., Web servers such as a walled garden application, mobile device applications, data search applications, Web Browsers, e-mail applications, and so on).

For instance, in one implementation, a pull consumer 112 is designed to sort XML source content (i.e., an XML sorting pull consumer) according to pre-specified criteria (e.g., alphabetically by XML tag) for subsequent distribution to an XML editor. In this example, the XML editor is client application 114, which registered the XML sorting pull consumer with a pull manager 110.

In another implementation, a pull consumer 112 is designed to convert pulled XML source content (e.g., headlines from a news data feed, sports scores, weather, etc.) into HTML content for subsequent distribution as customized data 118 to another Web server. (E.g., sports scores data in a compact XML format are processed to become decorated with UI in an HTML presentation). In this example, the Web server is client application 114, which registered the XML to HTML converter pull consumer with a pull manager 110. The Web server communicates the HTML data (e.g., representing the pulled source content in a data format that is useful to client application(s)) to any number of requesting Web browsers for presentation.

Other exemplary pull consumers 112 (e.g., investor pull consumers, etc.) are described in greater detail below in reference to TABLE 2.

Accordingly, client application(s) 114 utilize exposed pull consumer application specific APIs 130 to access at least a portion of pulled cached/customized data 118 from pull consumer 112. Exemplary application specific APIs are described in greater detail below in the section titled "Exemplary Pull Managed Device APIs".

Client application 114 may or may not be the final consumer of pull manager 110 pulled and pull consumer 112 customized data 118. For example, in one implementation, pull managed device 106 is coupled over network 104 to remote computing device 120. The remote computing device includes a 3$^{rd}$ party application 122, which in this example is a Web browser. The client application of this example is a Web server and customized data is Hypertext Markup Language (HTML) data. The Web browser accesses the Web server via a URL to retrieve the HTML data. The Web server communicates the HTML data to the Web browser as one or more electronic files 124 (e.g., Web pages 132) for subsequent processing and/or presentation.

Although FIG. 1 has been described with respect to pulling networked source content 108 from content provider(s) 102, pull manager(s) 110 may also retrieve source content from other data sources such as from locally managed content sources. For instance, pull managed device 106 is coupled to database 134 such that: (a) pull manager(s) can pull source content 136 from the database; (b) distribute the corresponding pulled data 116 to client application 114 registered pull consumer(s) 112; and (c) thereby provide client application(s) 114 with access to customized data 118 corresponding to the local data source.

For these reasons, locally and remotely deployed source content 136 and 108 are hereinafter individually or collectively referred to as "source content", unless otherwise specified. Additionally, content provider(s) 102 and other content provider(s) such as database 134 are individually referred to as "content provider" and collectively referred to as "content providers", unless otherwise specified.

In light of the above, system 100 provides high level data pull architectures for "partner managed information pulls" to client application(s) 114. That is, client application(s) that consume source content are not dedicated to actual data pulling, parsing and/or transformation activities with respect to consumed source content. Rather, client application(s) are "client(s)" that receive benefits of respective partner operations; i.e., pull manager 110 and pull consumer 112 operations.

System 100 further allows client application developers to particularly specify (or provide interfaces for others to specify) source content that is to be accessed by their applications 114. This provides substantial control over the quality, reliability, source, freshness, updating, etc., of source content that is available to consumers using the application(s).

System 100 further allows for multiple different client applications 114 to create respective instances of a single pull consumer 112 type (e.g., XML sorting, news, etc.), or utilize different pull consumer types to leverage specific pulled data parsing and/or transformation operations supplied by them.

Moreover, system 100 further allows for a pull manager 110 to substantially optimize its source content 108 pulling operations across multiple client applications 114 by identifying and consolidating multiple requested data pulls that are each respectively based on same data pulling criteria. For instance, multiple client application requested data pulls to a same data feed that are scheduled for a same time are consolidated by the pull manager into a single data pull operation. The pull manager updates any number of corresponding client application registered pull consumers 112 with the information from the consolidated/single data pull. Furthermore, a single pull consumer itself can be shared across multiple client applications. Thus, application developers can design suites of applications that have access to the same data that has a similar point-in-time data freshness.

Each of the described aspects of system 100 substantially reduces client application code footprints, data storage requirements, development expenses, while increasing client application configurability and scalability across multiple hardware platforms (e.g., personal computers, servers, thin clients, mobile devices such as handhelds or laptop devices, multiprocessor and microprocessor-based systems, etc.).

An Exemplary Pull Managed Computing Device

Figure 2:
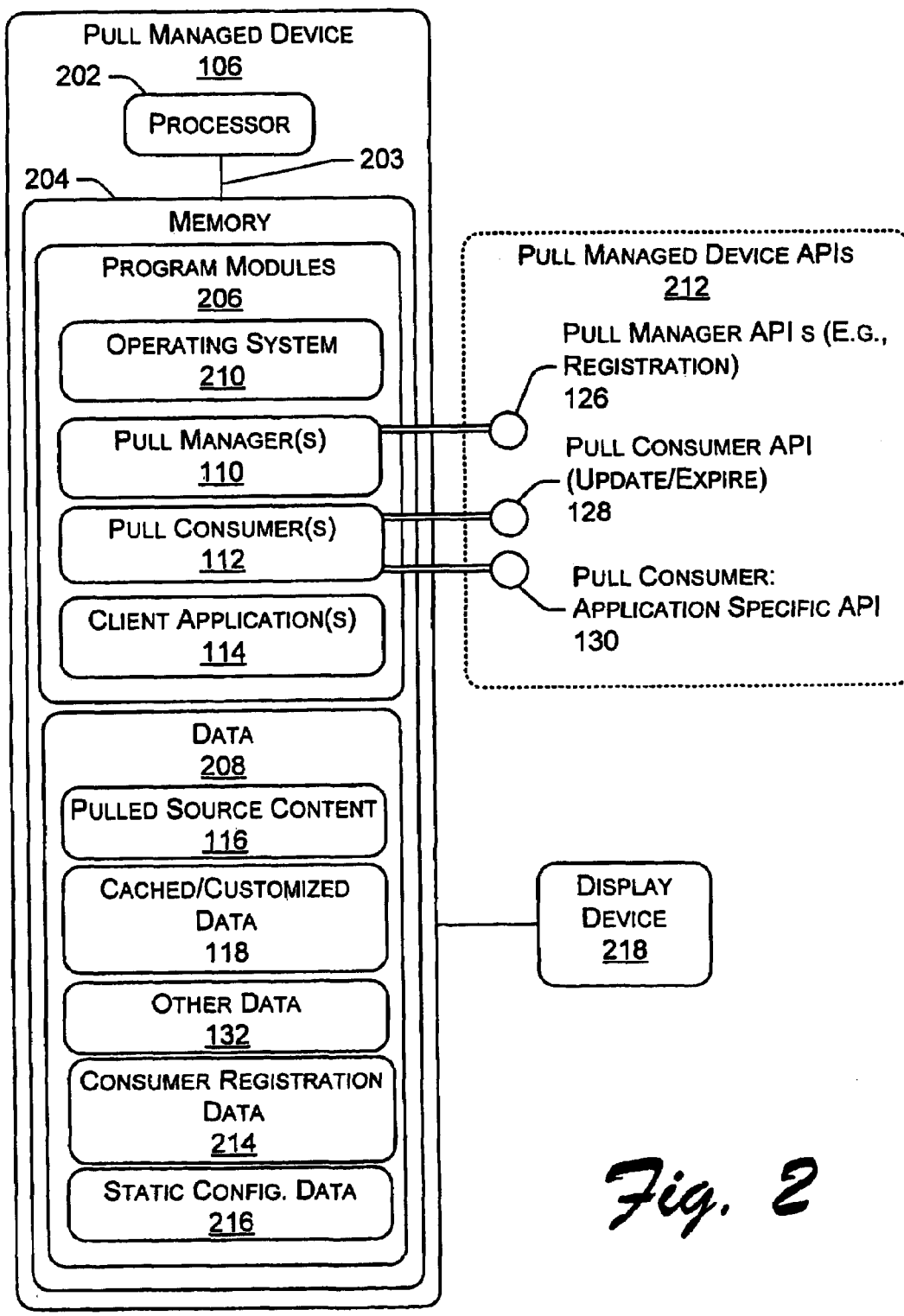
FIG. 2 shows further aspects of an exemplary pull managed computing device of FIG. 1.

FIG. 2 shows further aspects of an exemplary pull managed computing device 106 of FIG. 1. The pull managed computing device is operational as any one of a number of different computing devices such as a personal computer, an image server computer, a thin client, mobile devices such as a hand-held or laptop device, a multiprocessor system, a microprocessor-based system, a network PC, minicomputer, mainframe computer, and so on. Accordingly, computing devices can range from full-resource devices with substantial memory and processing resources (e.g., personal computers, TV recorders equipped with hard-disks) to low-resource devices with limited memory and/or processing resources (e.g., mobile devices, traditional set-top boxes, etc).

Pull managed computing device 106 includes processor 202 coupled across system bus 203 to system memory 204. The system bus connects various components within the pull managed device. The system bus is implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

System memory 204 includes any combination of volatile and non-volatile computer-readable media for reading and writing data. Volatile computer-readable media includes, for example, random access memory (RAM). Non-volatile computer-readable media includes, for example, read only memory (ROM), magnetic media such as a hard-disk, an optical disk drive, a floppy diskette, a flash memory card, a CD-ROM, and so on.

Processor 202 is configured to fetch and execute computer program instructions from applications or program modules 206 portion of memory 204. Program modules typically include computer program applications, routines, objects, components, and so on, for performing particular tasks or implementing particular abstract data types. While executing computer program instructions from program modules 206 portion of memory 204, processor 202 is configured to fetch data from data 208 portion of the memory.

Operating system 210 and other application programs 206 are stored in non-volatile memory 204 and executed on processor 202 to provide a runtime environment. A runtime environment facilitates extensibility of client device 106 by allowing various interfaces to be defined that, in turn, allow program modules 206 to interact with one another as well as other applications executing on other devices (e.g., remote computing device 110 of FIG. 1). Such other application programs include, pull manager(s) 110, pull consumer(s) 112, client application(s) 114, and other modules (not shown) such as a Web browser, etc.

These and other aspects of pull managed device 106 are now described in reference to exemplary pull managed device APIs 212.

Exemplary Pull Managed Device APIs 212

TABLE 1 illustrates an exemplary partner pull manager API 126.

TABLE 1

An Exemplary Partner Pull Manager API 126

```
namespacePartnerPull
{
    public sealed class PartnerPullManager
    {
    public static PartnerPullManager GetInstance( );
    public void RegisterPullConsumer(   pullConsumer,
                                        pullConsumerConfigData );
    public void UnRegisterPullConsumer(pullConsumer );
    }
}
```

Parameters passed into a respective interface are identified with syntactical elements located between a pair of open and close parenthesis to the immediate right of the interface. For instance, pull manager 110 exposes a partner pull manager API 126 including, for example, the GetInstance( ), and the RegisterPullConsumer(pullConsumer, pullConsumerConfigData) interfaces. The GetInstance( ) interface does not specify any parameters. The RegisterPullConsumer( . . . ) interface specifies two parameters, "pullConsumer" and "pullConsumerConfigData" respectively. These interfaces (as well as other API 104 interfaces described below) may be overloaded. This means that all of an interface's specified parameters may not required, or may be provided in a number of different data formats (e.g., a reference to a resource, verses actual resource values) unless otherwise specified in an interface's corresponding description.

The GetInstance( ) interface is used by client application(s) 110 to: (a) create a new instance of pull manager 110; or (b) if an instance of the pull manager is already executing for a current client application process, to return a current process instance of pull manager 110. The reason for this differentiation is that the pull manager is a per-process singleton—that is there is only one pull manager per process. The number of client applications that can be managed by an individual particular process is dependent on pull managed device 106 implementation characteristics. For instance, a single pull manager 110 may be utilized by a single client application 114, or shared across multiple client applications executing in a same process space if the computing device 106 supports a multiprocessing environment.

In light of the above, since the pull manager 110 is a per-process singleton, if there already happens to be one available in the same process (i.e., already generated from another client application 114), then the GetInstance( ) interface will simply return the already generated pull manager. Otherwise, a new instance of the pull manager is generated.

The RegisterPullConsumer pullConsumer, pullConsumerConfigData) interface is utilized by a client application 114 to register a pull consumer 112 with the pull manager 110. The "pullConsumer" parameter substantially uniquely identifies the pull consumer being registered. The "pullConsumerConfigData" parameter indicates at least: (a) a substantially unique name corresponding to the registered pull consumer; and (b) a URI or data feed reference to specific remotely deployed content (e.g., source content 108 of FIG. 1) that is of interest to the pull consumer. Other operating parameters corresponding to the registered pull consumer are optionally indicated by this data configuration parameter as well. This "pullConsumerConfigData" information is a reference to a section of configuration information (i.e., see the consumer registration data 214 of FIG. 2), as described in greater detail below in reference to TABLE 2.

In one implementation, "pullConsumerConfigData" information is specified in an XML data format. For instance, the pullConsumerConfigData parameter of the RegisterPullConsumer( . . . ) interface optionally further indicates the following information:

<ContentFeedProxy>—this tag indicates a hostname of proxy server (if any) through which source content (i.e., pull data) should be fetched.

<LocalHttpPort>—this tag defines, when a content source 102 is a local Web server, what port the Web server will be listening on for HTTP requests on the pull managed device 106. This allows requests for feeds served from http://localhost to the specified port. In one implementation, port 80 is used, but some services may be configured to use a different port.

<PullTimeOut>—this tag indicates an amount of time to wait before timing out on a pull web request.

<RefreshInterval>—this tag indicates a periodicity at which pulled source content 112 is refreshed by the pull manager 110; and <FreshnessDuration>—this tag indicates an amount of time, after which pulled data is no longer considered to be current.

This configuration information is global across all pulls made for a particular pull consumer 112. However, pull configuration information is configured per pull by the client application 114.

In one implementation, the pull manager 110 may provide one or more default values for any registration data that is not specified by a client application 114. For example, if a time-out value is not specified, a default time-out value is supplied.

Default pull consumer registration configuration data values are stored in static configuration data 216. In one implementation, the static configuration data is generated by a network administrator via a word processing user interface or other interface displayed on a display device 218 coupled to the pull managed device 106. The static configuration data includes at least a portion of the information discussed above in reference to the "pullConsumerConfigData: of the RegisterPullConsumer( . . . ) interface 126 (e.g., <ContentFeedProxy, <LocalHttpPort>, <PullTimeOut>, <RefreshInterval>, and/or <FreshnessDuration> tag information).

The UnRegisterPullConsumer( ) interface of pull manager API 126 is utilized by a client application 114 to un-register a pull consumer 112 from the pull manager 110. Invocation of this interface removes all corresponding pull consumer information from consumer registration data 214. No source content pulls are performed by pull manager 110 for unregistered pull consumers.

For purposes of this discussion, pullConsumerConfigData (i.e., from the RegisterPullConsumer( . . . ) interface) and any default value pull consumer 112 registration information is stored in consumer registration data 214, which maps this information provided to the registered pull consumer. (Default pull consumer registration configuration data values are stored in static configuration data 216).

TABLE 2 illustrates exemplary XML based pull consumer registration entries of consumer registration data 214.

TABLE 2

Exemplary Pull Consumer Registration Entries

```
<PartnerPull>
  <ContentFeedProxy></ContentFeedProxy>
  <LocalHttpPort>80</LocalHttpPort>
  <PullTimeOut>30 seconds</PullTimeOut>
  <RefreshInterval>1 hour</RefreshInterval>
  <FreshnessDuration>2 hours</FreshnessDuration>
  <PullConsumers>
    <PullConsumer name="XMLConsumer1">
      <ClassID>PartnerPull.XMLConsumer,PartnerPull</ClassID>
          // Class,Assembly
      <CustomInfo></CustomInfo>
      <Pulls>
        <Pull name="XMLFeed">
          <ContentFeedURL>
             http://www.search.johndoe.com/categories.xml
          </ContentFeedURL>
          <RefreshInterval>15 minutes</RefreshInterval>
       <FreshnessDuration>30 minutes</FreshnessDuration>
        </Pull>
      </Pulls>
    </PullConsumer>
    <PullConsumer name="WeatherConsumer1">
      <ClassID>PartnerPull.WeatherConsumer,PartnerPull</ClassID>
          // Class,Assembly
      <CustomInfo></CustomInfo>
      <Pulls>
```

TABLE 2-continued

Exemplary Pull Consumer Registration Entries

```
        <Pull name="WeatherObservations">
          <ContentFeedURL>
             http://www.weather.johndoe.com/obs.txt
          </ContentFeedURL>
          <RefreshInterval>20 minutes</RefreshInterval>
          <FreshnessDuration>45 minutes</FreshnessDuration>
        </Pull>      <Pull name="WeatherForecast">
          <ContentFeedURL>
             http://www.weather.johndoe.com/fcst.txt
          </ContentFeedURL>
          <RefreshInterval>20 minutes</RefreshInterval>
          <FreshnessDuration>45 minutes</FreshnessDuration>
        </Pull>
      </Pulls>
    </PullConsumer>
  </PullConsumers>
</PartnerPull>
```

Specifications for a pull consumer 112 (i.e., <PullConsumer>) include, for example:

<ClassID>—this tag indicates a class (or type) of pull consumer that is being configured. Each pull consumer class corresponds to a particular predefined pull consumer class definition. Pull consumer classes include, for example, class type definitions for: (a) XML (e.g. XML sorting pull consumers); (b) weather (e.g. a consumer to obtain weather observation/forecast data for a given postal code or weather location ID); (c) investor (e.g., a pull consumer to obtain quote information for a given stock symbol); (d) news (e.g. a pull consumer to obtain local news for a given postal code, city and/or state).

<CustomInfo>—this tag indicates an optional section for any pull consumer-specific data (e.g., data for specifying sorting criteria in an XML Consumer, etc.).

<Pulls>—this tag indicates a set of multiple data pulls to be associated with this particular pull consumer instance.

Pull consumer 112 "name"s are substantially unique name to enable client application(s) 110 to differentiate among more than one pull consumer. Pull consumers with the same "ClassID" are allowed. All <Pull>s associated with any given pull consumer need not be defined. For instance, in one implementation, a Weather pull consumer is defined with a single forecast data feed.

Specifications for a data pull (i.e., a <Pull>), include a "name" attribute, which is a substantially unique name for the data pull within the scope of the specified pull consumer 112. This enables each pull consumer to handle multiple pulled source content 112 arriving via UpdateData( ) and ExpireData( ) calls from the pull manager 110.

<Pull> tags or specifications further include <ContentFeedProxy, <LocalHttpPort>, <PullTimeOut>, <RefreshInterval>, and <FreshnessDuration> tags, which correspond to definitions discussed above in reference to the "pullConsumerConfigData: of the RegisterPullConsumer( . . . ) interface 126.

As illustrated by TABLE 2, exemplary pull consumers 112 are each respectively provided with specific syntax and structure in consumer registration data 214. TABLE 2 illustrates registration information for two (2) exemplary pull consumers (i.e., XMLConsumer1 and WeatherConsumer1) along with corresponding configuration information. For example, XMLConsumer1 has a single content feed URL (i.e., http://wwwjohndoe.search.com/categories.xml, which is refreshed by the pull manager 110 every 15 minutes, and whose data is not fresh after 30 minutes. Whereas WeatherConsumer1 has two content feeds (i.e., http://www.weatherjohndoe.com/obs.txt and http://www.weatherjohndoe.com/fcst.txt) each of which is refreshed by the pull manager every 20 minutes, and whose data is not fresh after 45 minutes.

Accordingly, client application 114 can instantiate multiple instances of a particular pull consumer 112, wherein each instance may specify customized registration data (e.g., data feeds, refresh rates, etc).

An Exemplary Pull Consumer API 128

Pull Consumer(s) 112 implement pull consumer API 128. Each Pull Consumer represents a type instance for one or more source content data feeds into a client application 114. In other words, a pull consumer is an intermediary between a corresponding pull manager 110 and the client application that registered the pull consumer. The client application instantiates one or more pull consumers, registers them with the pull manager, and then utilize consumer-specific APIs 128 to access the pulled data 112. A pull Consumer inherently keeps track of its own parsing functions and/or transformations with respect to incoming data from the pull manager into appropriate data structures. TABLE 3 illustrates an exemplary partner pull consumer API 128.

TABLE 3

An Exemplary Partner Pull Consumer API 128

```
namespace PartnerPull
{
public interface IPartnerPullConsumer
    {
        void UpdateData( string pullName, Encoding responseEncoding, Stream pullData );
        void ExpireData( string pullName );
        <Optional Pull Manager Specific Methods>
    }
}
```

Pull manager 110 passes newly-pulled data 116 into a pull consumer object 112 via a call to UpdateData( . . . ), and then resets an internal FreshnessDuration count for that pull. In this example, "pullName" identifies the name of the corresponding data feed, "responseEncoding" indicates the encoding format of the incoming data (e.g., UTF-8, Unicode, ANSI, etc.), and "pullData" is the incoming data.

If, at any point, the pull manager 110 cannot fetch current data by the time the FreshnessDuration for that pull is hit, then it will call ExpireData( . . . ). This lets the pull consumer 112 know that the data is now stale and should no longer be served for the time being. In one implementation, when a pull consumer implementing the exemplary interface of TABLE 3 is first instantiated, all of its data is considered expired until the Pull Manager has a chance to pull it successfully for the first time.

Pull Consumer object 112 software developers may create their own custom APIs 130, specific to individual or domain specific needs of the consumer with respect to the pull manager 110. These custom APIs are represented in TABLE 3 with the <Optional Pull Manager Specific Methods> designation.

Depending on their respective types, each pull consumer 112 class instance will parse pulled source content 116 via custom private methods and then store it in custom private data structures 118. By pull manager 110 specifying a feed's pullName along with corresponding pulledData in calls to UpdateData( ), the pull consumer object can determine which feed data it needs to update as well as which parsing utility it should call to achieve that end. This will prove useful when we have more than one pull attached to the same Consumer instance.

TABLE 4 illustrates another interface that may be implemented by pull consumer 112.

TABLE 4

An Exemplary Application Specific API 130

```
namespace PartnerPull
{
public interface IPartnerPullConsumerInfo
    {
        DateTime GetLastUpdateTime( string pullName );
        IsExpiredData( string pullName );
        GetData(string pullName );
        <Optional Application Specific Methods>
    }
}
```

The interface of TABLE 4 is part of the partner pull consumer API 128. The GetLastUpdateTime( . . . ) function returns the last time that the named pull was refreshed into the pull consumer's cache 118. Client application 114 may post such data in a corresponding UI. For instance, the client application may post weather data along with the time it was last updated so that a user knows the freshness of the weather data. As discussed above with respect to TABLE 3, the pull manger 110 can expire data after a certain amount of time. The client application 114 can determine if data corresponding to the specified pull (i.e., "pullName") is stale via a call to the IsExpiredData( . . . ) method. The GetData( ) method returns parsed/customized data corresponding to the identified pull.

Pull Consumer object 112 software developers may create their own custom APIs 130, specific to individual needs of the client application(s) 110 that use them. These custom APIs are representing in TABLE 4 with the <Optional Application Specific Methods> designation.

An Exemplary Procedure to Manage Information Pulls

Figure 3:
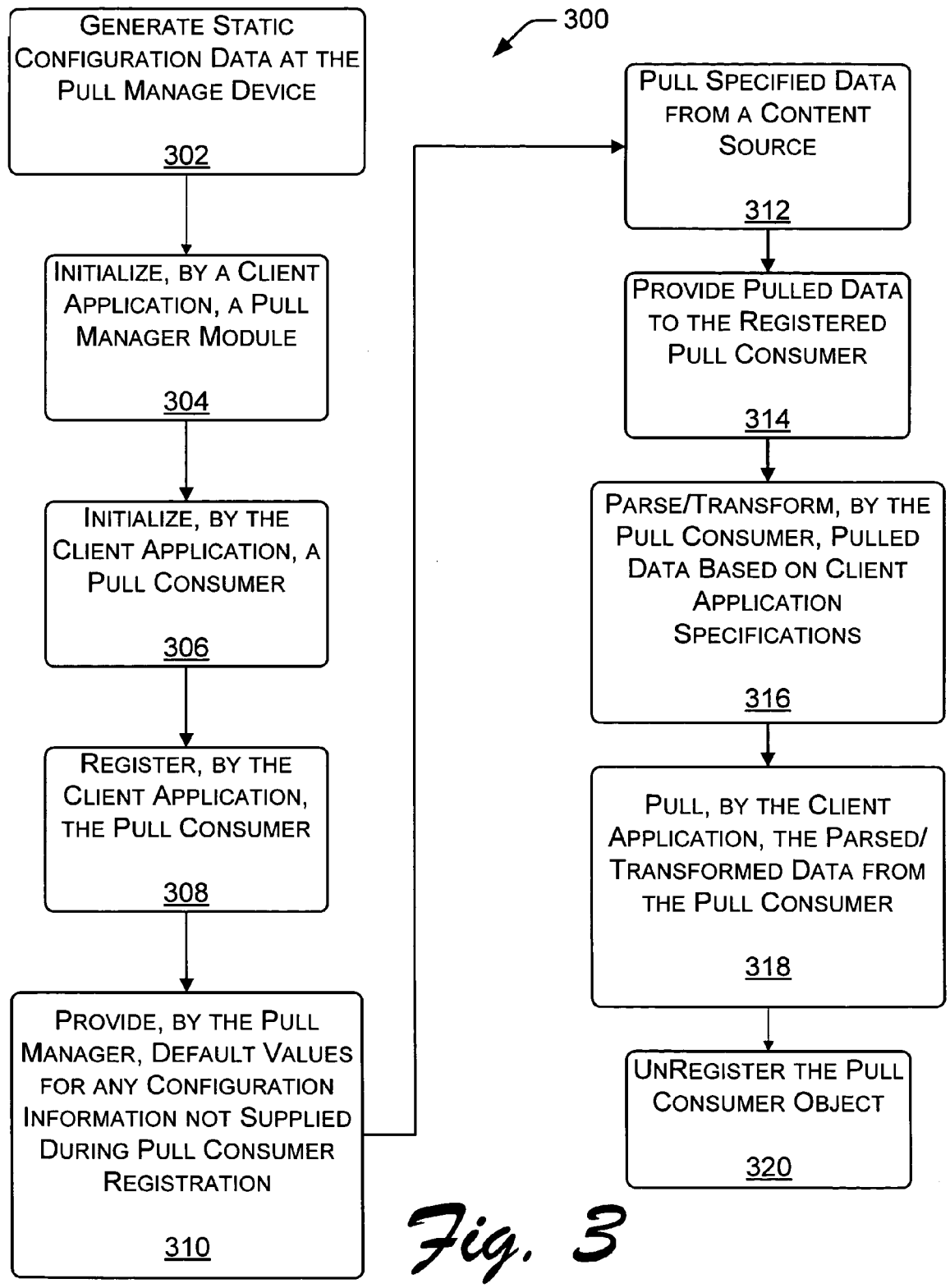
FIG. 3 shows exemplary procedure to manage information pulls.

FIG. 3 shows exemplary procedure to manage information pulls. At block 302, static configuration data 216 is generated at the pull managed device 106. At block 304, client application 114 initializes a new pull manager 110 or obtains a current process pull manager. In one implementation, this operation is performed during initialization operations of client application 114.

At block 306, client application 114 initializes/instantiates pull consumer 112. For instance, consider the following exemplary client application of TABLE 5 that defines a search application and an XML pull consumer 112 (i.e., <Consumer name="XMLConsumer1"/>).

TABLE 5

An Exemplary Static Configuration Data File 214

```
<Apps>
 <Search>
  <MainPage>
   <MainPageSection name="Categories">
    <Consumer name="XMLConsumer1" />
   </MainPageSection>
  </MainPage>
 </Search>
</Apps>
```

TABLE 5-continued

An Exemplary Static Configuration Data File 214

```
<PullConsumers>
  <PullConsumer name="XMLConsumer1">
    <ClassID>PartnerPull.XMLConsumer,PartnerPull</ClassID>
    <Pull name="XMLFeed">
      <ContentFeedUrl>http://www.search.johndoe.com/categ.xml
      <RefreshInterval>15 minutes</RefreshInterval>
      <FreshnessDuration>30 minutes</FreshnessDuration>
    </Pull>
  </PullConsumer>
</PullConsumers>
```

The client application 114 of TABLE 5 specifies a pull consumer 112 with the name "XMLConsumer1". The client application queries static configuration data 216 to identify a corresponding XMLConsumer1 <PullConsumer> . . . </PullConsumer> section. Information in the <ClassID> tag is optionally used by the client application to identify and generate a specific type of pull consumer when the application is not preconfigured to know what type of pull consumer to generate. For example, the client application can instantiate the appropriate pull consumer object based on the information provided by a corresponding <ClassID> tag. E.g., XMLConsumer xmlPullConsumer1=new XMLConsumer( ).

Moreover, the identified XMLConsumer1 <PullConsumer> . . . </PullConsumer> section of this example further indicates data feeds, refresh rates, etc., as described above with respect to the partner pull manager API 126 (see also, the RegisterPullConsumer ( . . . ) API of TABLE 1). The client application 114 ideally uses this pull consumer 112 specific information to configure operations for that consumer's feeds such as a periodicity for the pull manager 110 to perform data retrieval procedures. Although not shown in TABLE 5, configuration data may also be specified for a client to query a consumer for data. It can be appreciated that just about any type of configuration information that easily customizes operations of the system 100 of FIG. 1 can be represented in the configuration file 214.

In one implementation, the operation of block 306 is performed by client application 114 during initialization.

At block 308, the client application 114 registers the instantiated pull consumer 112. For example the client application registers the pull consumer objects with pull manager 110 by passing a reference to the pull consumer along with information identified in the <PullConsumer> . . . </PullConsumer> section of the static configuration data 216. E.g., PullManager.RegisterPullConsumer(xmlPullConsumer1, pullConsumerConfigData). In one implementation, the operation of block 308 is performed by the client application during initialization operations.

At block 310, the pull manager 110 provides default values for any number of configuration information that was not supplied by the client application 114 during registration of pull consumer 112. Such default information is provided by static configuration data 216.

At block 312, the pull manager 110 pulls source content from one or more data feeds at content provider(s) (e.g., content provider(s) 102 and/or locally managed content providers such as database 134). These data feeds were specified by during client application 114 registration of pull consumer 112 and subsequently stored by the pull manager into consumer registration data 214 (see also, TABLE 2).

At block 314, pull manager 110 invokes partner pull consumer API 128 (i.e., the UpdateData( ) interface) to push previously pulled source content 116 to the registered pull consumer 112. At block 316, the registered pull consumer parses and/or transforms the pulled source content according to its particular implementation. Modified pulled source content is stored as cached/customized data 118.

At block 318, the client application 114 invokes client specific API 130 to pull at least a portion of cached/customized data 118 from the registered pull consumer 112. For example, consider that the API 130 defines a GetXML( ) method. In this example, client application obtains cached/customized data from the registered pull consumer according to the following statement: XmlDocument xmlTree=xmlPullConsumer1.GetXML( ). In one implementation, the client application pulls cached/customized data 118 from the registered pull consumer 112 on a periodic basis that is determined according to any number of different criteria (e.g., in response to device boot-up operations, specific user actions (log-on operations, etc.), time-based criteria (once a minute, hour, week, etc.) and so on).

For purposes of discussion, blocks 312-318 are shown as a set of sequential operations. However, blocks 312, 314, and 316 are part of a loop that repeats until corresponding pulls are unregistered or become unavailable. Additionally, block 318 may be in a separate loop in the client application, which is typically a separate process.

Based on the examples of block 318 and client application 114 of TABLE 5, the client application will receive an XML tree filled with data that can be used in the client application, in this case to render search categories in a user interface. If the client application receives an empty XML tree, then parsed/transformed data 118 may be blank by choice or may have expired (i.e., via an ExpireData( ) method call from pull manager 110). An empty tree may be returned, even though the data has not expired, because data for that query does not exist. For example, in one implementation, a query into the price and delta for a bogus stock symbol is programmed to return an empty tree. To determine if the data has expired, the client application can call the IsExpiredData( ) method described above with respect to TABLE 4.

The Consumer API 128 can be extended according to the needs of the client application 114 to override data-access functions in order to pass back whether the data is expired and the last update time in addition to the data itself, all at the same time. This strategy avoids any race conditions that may arise when using functions like IsExpiredData( ) and GetData( ) in separate calls.

At block 320, client application 114 unregisters previously registered pull consumer 112 with the pull manager 110. E.g., pullManager.UnRegisterPullConsumer(xmlPullConsumer1). In one implementation, this operation is performed during shutdown operations of the client application.

An Exemplary Computing Environment

Figure 4:
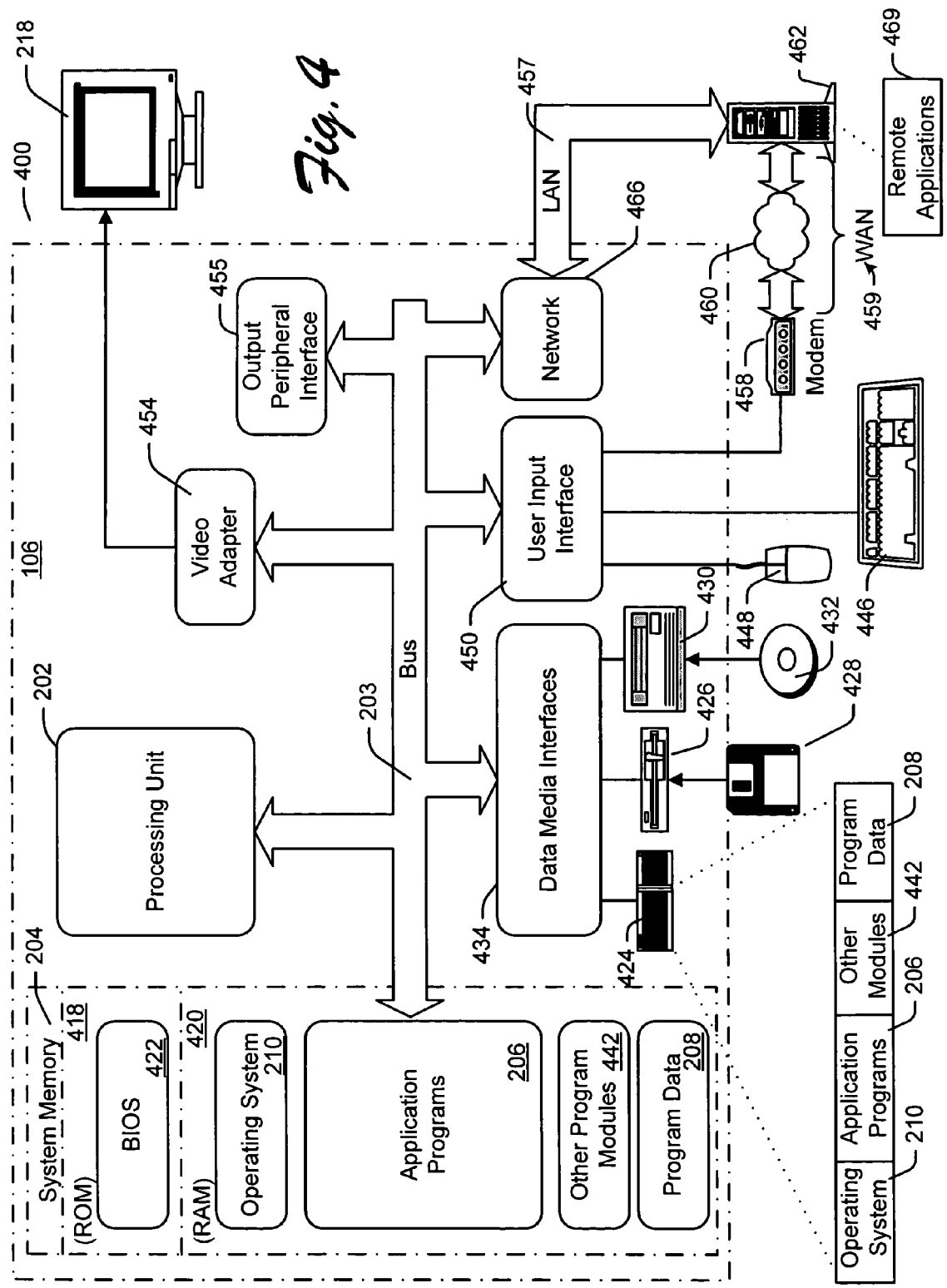
FIG. 4 shows exemplary computing environment within which systems and procedure to manage information pulls may be implemented.

FIG. 4 shows an example of a suitable computing environment 400 on which an exemplary system and procedure to manage information pulls may be implemented. Exemplary computing environment 400 is only one example of a suitable computing environment and is not intended to suggest any limitation as to the scope of use or functionality of an exemplary system and procedure to manage information pulls. The computing environment 400 should not be interpreted as having any dependency or requirement relating to any one or combination of components illustrated in the exemplary computing environment 400.

An exemplary system and procedure to manage information pulls may be described in the general context of computer-executable instructions, such as program modules 206 being executed by a computer. Generally, program modules include routines, programs, objects, components, data structures, etc., that perform particular tasks or implement particular abstract data types. An exemplary system and procedure to manage information pulls may also be practiced in distributed computing environments where tasks are performed by remote processing devices that are linked through a communications network. In a distributed computing environment, program modules may be located in both local and remote computer storage media including memory storage devices.

As shown in FIG. 4, the computing environment 400 includes a general-purpose computing device in the form of a computer 106 of FIGS. 1 and 2. The components of computer 106 may include, by are not limited to, one or more processors or processing units 202, a system memory 204, and a bus 203 that couples various system components including the system memory 204 to the processor 202.

Bus 203 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 106 typically includes a variety of computer-readable media. Such media may be any available media that is accessible by the computer 106, and it includes both volatile and non-volatile media, removable and non-removable media. For example, the system memory 204 includes computer readable media in the form of volatile memory, such as random access memory (RAM) 420, and/or non-volatile memory, such as read only memory (ROM) 418. A basic input/output system (BIOS) 422, containing the basic routines that help to transfer information between elements within computer 106, such as during start-up, is stored in ROM 418. RAM 420 typically contains data and/or program modules that are immediately accessible to and/or presently be operated on by processor 110.

Computer 106 may further include other removable/non-removable, volatile/non-volatile computer storage media. By way of example only, FIG. 4 illustrates a hard disk drive 424 for reading from and writing to a non-removable, non-volatile magnetic media (not shown and typically called a "hard drive"), a magnetic disk drive 426 for reading from and writing to a removable, non-volatile magnetic disk 428 (e.g., a "floppy disk"), and an optical disk drive 430 for reading from or writing to a removable, non-volatile optical disk 432 such as a CD-ROM, DVD-ROM or other optical media. The hard disk drive 424, magnetic disk drive 426, and optical disk drive 430 are each connected to bus 203 by one or more interfaces 434.

The drives and their associated computer-readable media provide nonvolatile storage of computer readable instructions, data structures, program modules and other data for computer 106. Although the exemplary environment described herein employs a hard disk, a removable magnetic disk 428 and a removable optical disk 432, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 428, optical disk 432, ROM 418, or RAM 420, including, by way of example, and not limitation, an OS 210, one or more application programs 206, other program modules 442, and program data 208. Each such OS 210, one or more application programs 206, other program modules 442, and program data 208 (or some combination thereof) may include an embodiment of an exemplary system and procedure to manage information pulls.

A user may enter commands and information into computer 106 through input devices such as keyboard 446 and pointing device 448 (such as a "mouse"). Other input devices (not shown) may include a microphone, joystick, game pad, satellite dish, serial port, scanner, or the like. These and other input devices are connected to the processing unit 202 through a user input interface 450 that is coupled to bus 203, but may be connected by other interface and bus structures, such as a parallel port, game port, or a universal serial bus (USB).

A monitor 218 or other type of display device is also connected to bus 203 via an interface, such as a video adapter 454. In addition to the monitor, personal computers typically include other peripheral output devices (not shown), such as speakers and printers, which may be connected through output peripheral interface 455.

Computer 106 may operate in a networked environment using logical connections to one or more remote computers, such as a remote computer 462. Logical connections shown in FIG. 4 are a local area network (LAN) 457 and a general wide area network (WAN) 459. Such networking environments are commonplace in offices, enterprise-wide computer networks, intranets, and the Internet. Remote computer 462 may include many or all of the elements and features described herein relative to computer 106.

When used in a LAN networking environment, the computer 106 is connected to LAN 457 via network interface or adapter 466. When used in a WAN networking environment, the computer typically includes a modem 458 or other means for establishing communications over the WAN 459. The modem 458, which may be internal or external, may be connected to the system bus 203 via the user input interface 450 or other appropriate mechanism.

Depicted in FIG. 4 is a specific implementation of a WAN via the Internet. Computer 106 typically includes a modem 458 or other means for establishing communications over the Internet 460. Modem 458, which may be internal or external, is connected to bus 203 via interface 450.

In a networked environment, program modules depicted relative to the personal computer 106, or portions thereof, may be stored in a remote memory storage device. By way of example, and not limitation, FIG. 4 illustrates remote application programs 469 as residing on a memory device of remote computer 462. The network connections shown and described are exemplary and other means of establishing a communications link between the computers may be used.

Computer Readable Media

An implementation of exemplary subject matter to manage information pulls may be stored on or transmitted across some form of computer-readable media. Computer-readable media can be any available media that can be accessed by a computer. By way of example, and not limitation, computer readable media may comprise "computer storage media" and "communications media".

"Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

The described arrangements and procedures provide for a high level customizable and scalable architecture to manage information pulls. Although the arrangements and systems to manage information pulls have been described in language specific to structural features and methodological operations, the arrangements and procedures as defined in the appended claims are not necessarily limited to the specific features or operations described. Rather, the specific features and operations are disclosed as preferred forms of implementing the claimed subject matter.

The invention claimed is:

1. A method for managing information pulls, the method comprising:
   receiving, from a first object, a registration to schedule data downloads from a data feed, the registration identifying the data feed and a second object; and
   responsive to receiving the registration, providing the data downloads from the data feed to the second object, wherein a single second object can be shared across multiple first objects; and
   wherein receiving the registration is performed by a third object that is configured to synchronize pulling operations across multiple first objects by identifying and consolidating multiple requested pulls that are each respectively based on same data pulling criteria;
   wherein said first object is configured to register said second object with said third object.

2. A method as recited in claim 1, wherein the data feed is identified by a Universal Resource Identifier.

3. A method as recited in claim 1, wherein the first object is a walled garden Web site, mobile device, data search, or any application that displays data.

4. A method as recited in claim 1, wherein the third object is executing on a server device, wherein the second object is executing on the server device, and wherein the first object is executing on a computing device that is independent of the server device.

5. A method as recited in claim 1, wherein the registration further identifies a refresh rate, and wherein providing the data downloads further comprises periodically providing the data downloads from the data feed to the second object based on the refresh rate.

6. A method as recited in claim 1, before receiving the registration, the method further comprising invoking, by the first object, an exposed pull manager object programming interface (API) to communicate the registration.

7. A method as recited in claim 1, wherein providing the data downloads further comprises invoking a pull consumer API, the exposed pull consumer API being exposed by the second object.

8. A method as recited in claim 1, further comprising retrieving, by the first object, the data downloads from the second object.

9. A method as recited in claim 1, further comprising:
   generating, by the second object, customized data by:
   (a) sorting the data downloads according to a first predetermined criteria;
   (b) converting the data downloads from a first data format to a second data format; and/or
   (c) organizing information corresponding to the data downloads into a structural organization that is different than structural organization of the data downloads; and
   retrieving, by the first object, the customized data from the second object.

10. A method as recited in claim 1, further comprising allowing the first object to access the data downloads through an exposed application program interface (API) that is substantially optimized to a type of information received by the second object, the API being exposed by the second object.

11. A computer-readable storage medium comprising computer-executable instructions for managing information pulls, the computer-executable instructions being executable by a processor and comprising instructions for:
   scheduling data downloads from a data feed, the data downloads for communicating to a consumer, the data downloads, the data feed, and the consumer having been identified by a data client of the consumer;
   wherein the scheduling data downloads is performed by a pull manager object, and wherein the pull manager object, the consumer, and the data client are separately executable on respective different computing devices;
   periodically retrieving the data downloads from the data feed; and
   communicating the data downloads to the consumer,
   wherein a single consumer can be shared across multiple applications;
   wherein the pull manager is configured to synchronize pulling operations across multiple applications by identifying and consolidating multiple requested pulls that are each respectively based on same data pulling criteria;
   wherein said applications are configured to register the consumer with the pull manager.

12. A computer-readable storage medium as recited in claim 11, wherein the data feed is identified with a Universal Resource Identifier.

13. A computer-readable storage medium as recited in claim 11, wherein the instructions for scheduling data downloads, the data client further identifies a refresh rate, and wherein the instructions for periodically retrieving further comprise instructions for periodically retrieving the data downloads from the data feed based on the refresh rate.

14. A computer-readable storage medium as recited in claim 11, before the instructions for scheduling data downloads, the computer-executable instructions further comprising instructions for communicating a registration message to the pull manager, the registration message comprising an indication of the data downloads, the data feed, and the target consumer.

15. A computer-readable storage medium as recited in claim 11, wherein the instructions for communicating the data downloads to the consumer further comprises instructions for updating a cache corresponding to the consumer.

16. A computer-readable storage medium as recited in claim 11, further comprising computer-executable instructions for fetching the data downloads from the consumer by the data client.

17. A computer-readable storage medium as recited in claim 11, further comprising computer-executable instructions for:
   customizing the data downloads on the consumer according to a predetermined criteria to generate customized data; and
   fetching the customized data by the data client.

18. A computer-readable storage medium as recited in claim 11, further comprising computer-executable instructions for expiring the data downloads on the consumer based on a data freshness indication supplied by the data client.

19. A computing device for managing information pulls, the computing device comprising:
   a processor; and
   a memory coupled to the processor, the memory comprising computer-executable instructions, the computer-executable instructions being executable by the processor and comprising instructions for:
   responding to a registration request from a client object by scheduling data pulls from a data feed, the registration request indicating the data feed;
   pulling data from the data feed according to scheduled data pulls, wherein the data is pulled by a pull manager on a server device; and
   communicating data pulled from the data feed to an entity identified in the registration request, the entity not being the client object,
   wherein a single entity can be shared across multiple client objects;
   wherein the pull manager is configured to synchronize pulling operations across multiple client objects by identifying and consolidating multiple requested pulls that are each respectively based on same data pulling criteria;
   wherein said client objects are configured to register the entity with the pull manager.

20. A computing device as recited in claim 19, wherein the data feed is identified by a Universal Resource Identifier.

21. A computing device as recited in claim 19, wherein the client object is a walled garden object, an investor object, or a weather object.

22. A computing device as recited in claim 19, wherein the client object is embodied on a mobile device that is physically independent of the server device.

23. A computing device as recited in claim 19, wherein the registration request further indicates a refresh rate, and wherein the instructions for pulling data from the data feed further comprises instructions for periodically pulling data from the data feed based on the refresh rate.

24. A computing device as recited in claim 19, before the instructions for responding to a registration request, the computer-executable instructions further comprising instructions for:
   specifying the entity based at least in part on types of operations performed by the entity to customize data pulled from the data feed on behalf of the client object; and
   communicating the registration request by the client object.

25. A computing device as recited in claim 19, further comprising computer-executable instructions for retrieving data from the entity by the client object, the data being selected from data pulled from the data feed or from data pulled from the data feed that has been customized by the entity according to predetermined criteria.

26. A computing device for managing information pulls, the computing device comprising:
   a processor;
   one or more computer-readable storage media associated with the processor, wherein the one or more computer-readable storage media comprises processor-executable instructions comprising:
   means for scheduling data downloads from a data feed, the data downloads for communicating to a target consumer, the data downloads, the data feed, and the target consumer having been identified by a data client of the target consumer; the target consumer and the data client being independent program modules;
   means for periodically retrieving the data downloads from the data feed by a pull manager on a server device; and
   means for communicating the data downloads to the target consumer;
   wherein a single target consumer can be shared across multiple data clients;
   wherein the pull manager is configured to synchronize pulling operations across multiple data clients by identifying and consolidating multiple requested pulls that are each respectively based on same data pulling criteria;
   wherein said data client is configured to register said target consumer with said pull manager.

27. A computing device as recited in claim 26, wherein the processor-executable instructions further comprise:
   means for specifying a refresh rate by the data client; and
   wherein the means for periodically retrieving the data downloads further comprises means for periodically retrieving the data downloads according to the refresh rate.

28. A computing device as recited in claim 26, wherein the processor-executable instructions further comprise means for gathering the data downloads from the target consumer by the data client.

29. A computing device as recited in claim 26, wherein the processor-executable instructions further comprise:
   means for customizing the data downloads by the target consumer, the means for customizing comprising:
   (a) means for sorting at least a portion the data downloads;
   (b) means for converting at least a portion the data downloads from a first data format to a second data format; and/or
   (c) means for representing at least a portion of the data downloads into a data structure that is different than structural organization of the data downloads.

30. A computing device as recited in claim 26, wherein the processor-executable instructions further comprise means for allowing the data client to access the data from the target consumer in a manner that is substantially optimized to a type of information received by the target consumer.

31. A method for managing information pulls, the method comprising:

communicating, by an object, registration information to a pull manager, the registration information specifying at least a pull consumer and a data feed, the data feed identifying source content and a content provider, the object, the pull manager, and the pull consumer being respective separate executable objects;

responsive to receiving the registration information, the pull manager:
(a) pulling the source content from the content provider, source content that has been pulled being pulled source content;
(b) communicating the pulled source content to the pull consumer; and retrieving, by the object, the pulled source content from the pull consumer, wherein a pull consumer can be shared across multiple objects;

wherein the pull manager is configured to synchronize pulling operations across objects by identifying and consolidating multiple requested pulls that are each respectively based on same data pulling criteria;

wherein said object is configured to register said pull consumer with said pull manager.

32. A method as recited in claim 31, wherein the data feed is a Universal Resource Identifier.

33. A method as recited in claim 31, wherein the content provider is a proxy server.

34. A method as recited in claim 31, wherein communicating registration information further comprises invoking, by the object, an exposed pull manager object programming interface (API).

35. A method as recited in claim 31, wherein communicating the pulled source content to the pull consumer further comprises invoking an exposed pull consumer API.

36. A method as recited in claim 31, wherein retrieving the pulled source content further comprises invoking an exposed pull consumer object specific API.

37. A method as recited in claim 31, wherein the pull consumer is designed to parse and/or customize the pulled source content into a substantially optimal data format and/or structure for a particular client application.

38. A method as recited in claim 31, wherein the pull consumer is an XML sorting, XML converting, weather, investor, or a news pull consumer.

39. A method as recited in claim 31, before communicating the registration information, the method further comprising:

instantiating, by the object, the pull manager; and
instantiating, by the object, the pull consumer.

40. A method as recited in claim 31, wherein the pulled source content is in a first data format and/or a first structural organization, before retrieving the pulled source content, the method further comprising customizing, by the pull consumer, the pulled source content into a second data format and/or a second structural organization, the first data format and/or the first structural organization being different than the second data format and/or the second structural organization.

41. A method as recited in claim 31, wherein communicating the registration information further comprises specifying any combination of a periodicity for the pull manager to pull the source content from the content source, a freshness duration indicating an amount of time after which the pulled data is no longer current, a local port for the pull consumer to listen for requests to receive the source content, and/or a timeout value indicating an amount of time to wait before timing out, by the pull manager, a pull request to the content provider.

42. A computer-readable storage medium comprising computer-executable instructions for managing information pulls, the computer-executable instructions being executable by a processor and comprising instructions for:

scheduling, by a data client, periodic data pulls from a particular data feed, the periodic data pulls to be performed by a pull manager that operates independently but under instruction of the data client; and scheduling, by the data client, communication of pulled data from the pull manager to a data consumer, the data consumer for caching the data, the data consumer providing a customized interface for the data client to access pull data, wherein a single data consumer can be shared across multiple data clients;

wherein the pull manager is configured to synchronize pulling operations across multiple data clients by identifying and consolidating multiple requested pulls that are each respectively based on same data pulling criteria;

wherein said data client is configured to register said data consumer with said pull manager.

43. A computer-readable storage medium as recited in claim 42, wherein the data feed is identified with a Universal Resource Identifier.

44. A computer-readable storage medium as recited in claim 42, further comprising instructions for specifying, by the data client, the data consumer as a target of pull manager pulled data.

45. A computer-readable storage medium as recited in claim 42, wherein the data consumer further customizes the data according to predetermined criteria.

46. A computer-readable storage medium as recited in claim 45, wherein the predetermined criteria specify sorting of pulled data, conversion of pulled data, and/or reorganization of pulled data.

47. A computer-readable storage medium as recited in claim 42, further comprising instructions for invoking the customized interface to access the data from the data consumer by the data client.

48. A computer-readable storage medium as recited in claim 42, further comprising instructions for instantiating the pull manager and the pull consumer by the data client.

49. A computer-readable storage medium as recited in claim 42, wherein the instructions for scheduling periodic data pulls further comprises instructions for specifying:

a refresh rate for the pull manager to periodically pull data from the particular data feed;

a freshness indication used to identify when pulled data should be expired at the data consumer;

a local port for the data consumer to listen for requests forward pulled and/or customized data to the data client; and/or a timeout indication to identify when a pull request to the particular data feed is to be timed-out.

50. A computing device for managing information pulls, the computing device comprising:
- a processor; and
- a memory coupled to the processor, the memory comprising computer-executable instructions, the computer-executable instructions being executable by the processor and comprising instructions for:
- communicating, by an object, registration information to a pull manager, the registration information specifying at least a pull consumer and a data feed, the data feed identifying source content and a content provider, the object, the pull manager, and the pull consumer being respective separate executable objects;
- responsive to receiving the registration information, the pull manager:
  - (a) pulling the source content from the content provider, source content that has been pulled being pulled source content;
  - (b) communicating the pulled source content to the pull consumer; and
- retrieving, by the object, the pulled source content from the pull consumer
- wherein a single pull consumer can be shared across multiple objects;
- wherein the pull manager is configured to synchronize pulling operations across multiple objects by identifying and consolidating multiple requested pulls that are each respectively based on same data pulling criteria;
- wherein said object is configured to register said pull consumer with said pull manager.

51. A computing device as recited in claim 50, wherein the pull consumer parses and/or customizes the pulled source content into a substantially optimal data format and/or structure for the object.

52. A computing device as recited in claim 50, wherein the pull consumer is an XML sorting, XML converting, weather, investor, or a news pull consumer.

53. A computing device as recited in claim 50, wherein the instructions for communicating registration information further comprise instructions for invoking, by the object, an exposed pull manager object programming interface (API).

54. A computing device as recited in claim 50, wherein the instructions for communicating the pulled source content to the pull consumer further comprise instructions for invoking an exposed pull consumer API.

55. A computing device as recited in claim 50, wherein the instructions for retrieving the pulled source content further comprise instructions for invoking an exposed pull consumer object specific API.

56. A computing device as recited in claim 50, before wherein the instructions for communicating the registration information, the computer-executable instructions further comprising instructions for:
- instantiating, by the object, the pull manager; and
- instantiating, by the object, the pull consumer.

57. A computing device as recited in claim 50, wherein the pulled source content is in a first data format and/or a first structural organization, before retrieving the pulled source content, the computer-executable instructions further comprising instructions for customizing, by the pull consumer, the pulled source content into a second data format and/or a second structural organization, the first data format and/or the first structural organization being different than the second data format and/or the second structural organization.

58. A computing device as recited in claim 50, wherein the instructions for communicating the registration information further comprise instructions for specifying any combination of a periodicity for the pull manager to pull the source content from the content source, a freshness duration indicating an amount of time after which the pulled data is no longer current, a local port for the pull consumer to listen for requests to receive the source content, and/or a timeout value indicating an amount of time to wait before timing out, by the pull manager, a pull request to the content provider.

59. A computing device for managing information pulls, the computing device comprising:
- a processor;
- one or more computer-readable storage media embodying processor-executable instructions comprising:
  - means for communicating, by an object, registration information to a pull manager, the registration information specifying at least a pull consumer and a data feed, the data feed identifying source content and a content provider, the object, the pull manager, and the pull consumer being respective separate executable objects;
  - responsive to receiving the registration information, the pull manager comprising:
    - (a) means for pulling the source content from the content provider, source content that has been pulled being pulled source content;
    - (b) means for communicating the pulled source content to the pull consumer; and
  - means for retrieving, by the object, the pulled source content from the pull consumer,
- wherein a single pull consumer can be shared across multiple objects;
- wherein the pull manager is configured to synchronize pulling operations across multiple objects by identifying and consolidating multiple requested pulls that are each respectively based on same data pulling criteria;
- wherein said object is configured to register said pull consumer with said pull manager.

60. A computing device as recited in claim 59, wherein the means for communicating the registration information, further comprise:
- means for instantiating, by the object, the pull manager; and
- means for instantiating, by the object, the pull consumer.

61. A computing device as recited in claim 59, wherein the pulled source content is in a first data format and/or a first structural organization, before retrieving the pulled source content, the pull consumer further comprising means for customizing the pulled source content into a second data format and/or a second structural organization, the first data format and/or the first structural organization being different than the second data format and/or the second structural organization.

62. A computing device as recited in claim 59, wherein the means for communicating the registration information further comprise means for specifying any combination of a periodicity for the pull manager to pull the source content from the content source, a freshness duration indicating an amount of time after which the pulled data is no longer current, a local port for the pull consumer to listen for requests to receive the source content, and/or a timeout value indicating an amount of time to wait before timing out, by the pull manager, a pull request to the content provider.

63. A computer-readable storage media embodying executable instructions which, when executed, provide a pull manager object program interface (API) comprising:
- a first interface that is used by a client object to create a new instance of the pull manager, or if an instance of the pull manager is already executing in a current process execution space, to return a current process instance of pull manager; and a second interface for the client object to register a pull consumer with the pull manager;

wherein the pull manager actively pulls source content from a data feed specified in the second interface, the pull manager communicating the source content to the pull consumer; and wherein the pull consumer caches and customizes the source content for subsequent downloading by the object, wherein a single pull consumer can be shared across multiple client objects;

wherein the pull manager is configured to synchronize pulling operations across multiple objects by identifying and consolidating multiple requested pulls that are each respectively based on same data pulling criteria.

64. A computer-readable storage media embodying executable instructions which, when executed, provide a pull manager API as recited in claim 63, wherein the second interface further provides for indicating by the client object an amount of time to wait before timing out on a pull request to the data feed, a periodicity at which source content is refreshed from the data feed, and/or an amount of time after which pulled source content from the data feed is no longer fresh.

65. A computer-readable storage media embodying executable instructions which, when executed, provide a pull manager API as recited in claim 63, further comprising a third interface for the client object to un-register the pull consumer such that the pull manager will no longer pull source content from the data feed.

66. A computer-readable storage media embodying executable instructions which, when executed, provide a pull consumer object program interface (API) comprising a first interface for a pull manager to pass newly-pulled data into a pull consumer object; and a second interface for accessing, by an application that is independent of the pull manager and the pull consumer, pulled data from the pull consumer, wherein a single pull consumer can be shared across multiple applications;

wherein the pull manager is configured to synchronize pulling operations across multiple applications by identifying and consolidating multiple requested pulls that are each respectively based on same data pulling criteria;

wherein said application is configured to register said pull consumer with said pull manager.

67. A computer-readable storage media embodying executable instructions which, when executed, provide a pull consumer API as recited in claim 66, wherein the second interface is domain specific to the application.

68. A computer-readable storage media embodying executable instructions which, when executed, provide a pull consumer API as recited in claim 66, further comprising a third interface for the pull manager to indicate to the pull consumer that pulled data is not fresh.

* * * * *